(12) United States Patent
Kaltenbach et al.

(10) Patent No.: US 11,590,960 B2
(45) Date of Patent: Feb. 28, 2023

(54) METHOD FOR A SERIAL DRIVING MODE OF A MOTOR VEHICLE

(71) Applicant: ZF Friedrichshafen AG, Friedrichshafen (DE)

(72) Inventors: Johannes Kaltenbach, Friedrichshafen (DE); Michael Roske, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 186 days.

(21) Appl. No.: 16/955,239

(22) PCT Filed: Nov. 16, 2018

(86) PCT No.: PCT/EP2018/081603
§ 371 (c)(1),
(2) Date: Jun. 18, 2020

(87) PCT Pub. No.: WO2019/120797
PCT Pub. Date: Jun. 27, 2019

(65) Prior Publication Data
US 2020/0324757 A1    Oct. 15, 2020

(30) Foreign Application Priority Data

Dec. 19, 2017  (DE) .................... 10 2017 223 168.8

(51) Int. Cl.
*F16H 3/12*       (2006.01)
*F16H 61/04*    (2006.01)
(Continued)

(52) U.S. Cl.
CPC ............ *B60W 20/40* (2013.01); *B60W 10/02* (2013.01); *B60W 10/06* (2013.01); *B60W 10/08* (2013.01);
(Continued)

(58) Field of Classification Search
CPC ...... B60W 20/40; B60W 10/02; B60W 10/06; B60W 10/08; B60W 10/113;
(Continued)

(56) References Cited

U.S. PATENT DOCUMENTS 6,490,945 B2 * 12/2002 Bowen ................. B60W 10/113
                                                              903/917
7,931,102 B2 *  4/2011 Katsuta ................ B60W 10/115
                                                              180/65.225
(Continued)

FOREIGN PATENT DOCUMENTS

CN        101896385 A     11/2010
CN        103415410 A     11/2013
(Continued)

OTHER PUBLICATIONS

International Search Report (English Translation) PCT/EP2018/081603, dated Jan. 28, 2019. (2 pages).
(Continued)

*Primary Examiner* — Sherry L Estremsky
(74) *Attorney, Agent, or Firm* — Dority & Manning, P.A.

(57) ABSTRACT

A method for serial operation of a motor vehicle with a transmission having a first electric machine, which is operated as a motor for driving the motor vehicle, and a second electric machine, which is operated as a generator, includes, after a generation of a change-over signal, switching the first electric machine from the operation as a motor to the operation as a generator, and switching the second electric machine from the operation as a generator to the operation as a motor in order to drive the motor vehicle.

18 Claims, 1 Drawing Sheet

(51) Int. Cl.
  *B60W 20/40*   (2016.01)
  *B60W 10/02*   (2006.01)
  *B60W 10/06*   (2006.01)
  *B60W 10/08*   (2006.01)
  *B60W 10/113*  (2012.01)
  *B60W 30/184*  (2012.01)
  *B60W 30/19*   (2012.01)
  *F16H 3/00*    (2006.01)
  *F16H 3/08*    (2006.01)

(52) U.S. Cl.
  CPC ...... *B60W 10/113* (2013.01); *B60W 30/1843* (2013.01); *B60W 30/19* (2013.01); *F16H 3/006* (2013.01); *F16H 3/126* (2013.01); *F16H 61/0403* (2013.01); *B60W 2510/087* (2013.01); *B60W 2510/30* (2013.01); *F16H 2003/0811* (2013.01); *F16H 2061/0422* (2013.01)

(58) Field of Classification Search
  CPC ............ B60W 30/1843; B60W 30/19; B60W 2510/087; B60W 2510/30; F16H 3/006; F16H 3/126; F16H 61/0403; F16H 2003/0811; F16H 2061/0422; F16H 2510/30

See application file for complete search history.

(56) References Cited

U.S. PATENT DOCUMENTS

| | | | |
|---|---|---|---|
| 8,047,314 B2* | 11/2011 | Oba | ............ B60L 50/61 |
| | | | 180/65.265 |
| 8,475,330 B2 | 7/2013 | Kaltenbach et al. | |
| 8,979,704 B2 | 3/2015 | Kaltenbach et al. | |
| 2009/0312143 A1 | 12/2009 | Allgaier et al. | |
| 2010/0032218 A1* | 2/2010 | Ideshio | ............ B60W 10/10 |
| | | | 475/5 |
| 2010/0078238 A1 | 4/2010 | Oba et al. | |
| 2015/0145442 A1 | 5/2015 | Miyamoto et al. | |
| 2016/0144704 A1 | 5/2016 | Ketfi-Cherif et al. | |
| 2017/0137016 A1 | 5/2017 | Yang et al. | |
| 2018/0201116 A1 | 7/2018 | Miyagawa et al. | |

FOREIGN PATENT DOCUMENTS

| | | |
|---|---|---|
| CN | 106853819 A | 6/2017 |
| DE | 102006036758 A1 | 2/2008 |
| EP | 1610038 B1 | 12/2005 |
| FR | 3007696 A1 | 1/2015 |
| JP | 2004052851 A | 2/2004 |
| JP | 2017043311 A | 3/2017 |
| WO | WO 2014/016679 | 1/2014 |
| WO | WO 2016/199227 | 12/2016 |

OTHER PUBLICATIONS

German Search Report DE102017223168.8, dated Oct. 8, 2018. (12 pages).

Chinese Office Action 201880070601,6, dated Sep. 5, 2022, (8 pages).

* cited by examiner

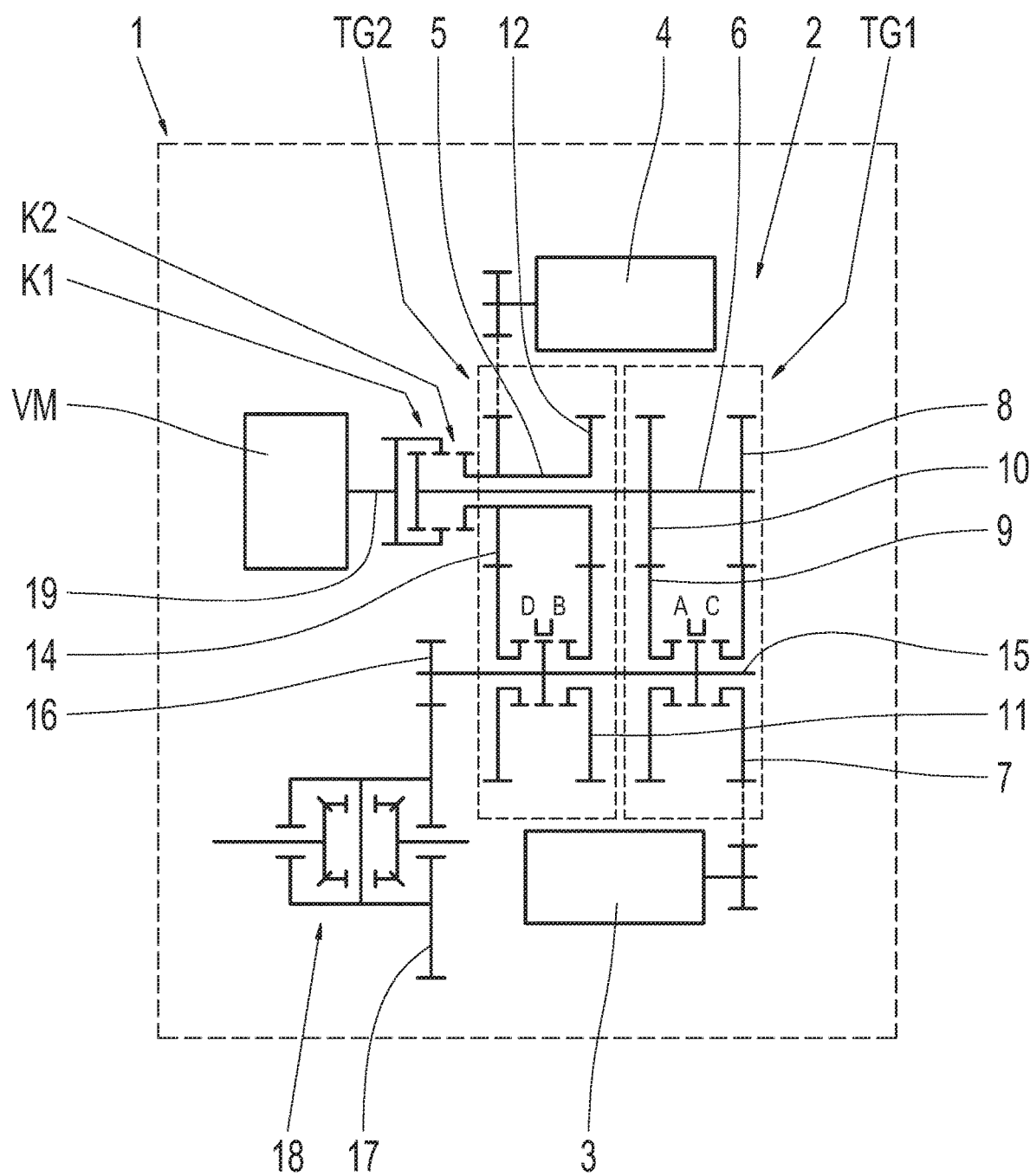

METHOD FOR A SERIAL DRIVING MODE OF A MOTOR VEHICLE

CROSS-REFERENCE TO RELATED APPLICATION

The present application is related and has right of priority to WO Publication No. 2019/120797 filed on Nov. 16, 2018 and to German Patent Application No. 10 2017 223 168.8 filed on Dec. 19, 2017, which are both incorporated by reference in their entirety for all purposes.

FIELD OF THE INVENTION

The invention relates generally to a method for a serial operation of a motor vehicle including a transmission, with a first electric machine, which is operated as a motor for driving the motor vehicle, and a second electric machine, which is operated as a generator. The invention also relates generally to a transmission, in which such a method is implemented.

BACKGROUND

A multitude of transmissions is known from the prior art, which are installed in motor vehicles and with the aid of which a serial operation of the motor vehicle can be implemented. EP 1 610 038 B1, for example, discloses a dual clutch transmission including a dual clutch and two electric machines. The dual clutch transmission is designed in such a way that a serial operation of the motor vehicle is implementable. In order to implement the serial operation, one electric machine is operated as a motor in order to drive the motor vehicle, while the other electric machine is operated as a generator in order to deliver the necessary electrical energy. DE 10 2006 036 758 A1 discloses a dual clutch transmission including a form-locking dual clutch and two electric machines.

One disadvantage of the transmissions known from the prior art is that the electric machine utilized for driving the motor vehicle is heavily thermally loaded during a serial operation having a slow ground speed and a high driving resistance, such as during travel on an uphill slope. Therefore, a serial operation can be maintained only for a limited time, because the electric machine would otherwise overheat. The other electric machine, which is operated as a generator, is not thermally overloaded, because the rotational speed of the other electric machine is not coupled to the ground speed, but rather to the rotational speed of the internal combustion engine.

SUMMARY OF THE INVENTION

Example aspects of the invention provide a method, with the aid of which a serial operation can be implemented over a longer time period and in the case of a high driving resistance.

A method of the type mentioned at the outset, includes, after a generation of a change-over signal, switching the first electric machine from the operation as a motor to the operation as a generator, and switching the second electric machine from the operation as a generator to the operation as a motor in order to drive the motor vehicle.

According to example aspects of the invention, it has been found that a serial operation in the forward direction or the reverse direction can be implemented in the case of a high driving resistance over a longer time period if the functions of the two electric machines are interchanged before one electric machine becomes too warm. This means, the electric machines are alternately utilized for driving the motor vehicle. The situation is therefore prevented in which the serial operation is interrupted because the electric machine operating as a motor becomes too warm. One further advantage is that both electric machines are uniformly loaded, which advantageously affects the service life of the electric machines.

A serial operation of a motor vehicle is understood to be an operation in which one of the two electric machines is operated as a generator and is driven by a drive unit, such as an internal combustion engine, and, therefore, the other of the two electric machines is utilized for driving the motor vehicle, i.e., is operated as a motor. During the serial operation, the motor vehicle usually has a low ground speed.

The electric machine includes at least a stator and a rotatably mounted rotor and is configured for converting electrical energy into mechanical energy in the form of rotational speed and torque when operated as a motor and for converting mechanical energy into electrical energy in the form of current and voltage when operated as a generator.

In one particular example embodiment, the change-over signal can be generated when a temperature of the first electric machine exceeds a threshold value or when a temperature of the first electric machine exceeds the threshold value and, in particular simultaneously, a temperature of the second electric machine falls below another threshold value. Such a generation of the change-over signal offers the advantage that the change-over takes place only when the change-over is absolutely necessary and, therefore, as infrequently as possible. The threshold value has a greater value than the other threshold value. The threshold value and/or the other threshold value can be predefined and/or stored in an electrical memory.

Alternatively or additionally, the change-over signal can be generated when a difference between the temperature of the first electric machine and the temperature of the second electric machine exceeds a further threshold value. Such a generation of the change-over signal offers the advantage that both electric machines are operated below the threshold value with respect to their temperature. The further threshold value can be predefined and/or stored in the electrical memory.

The temperature of the first electric machine and of the second electric machine can each be measured with the aid of one sensor or multiple sensors. Due to the dependence of the change-over signal on the temperature of the first electric machine and/or on the temperature of the second electric machine, the first electric machine and/or the second electric machine can be prevented from overheating during the serial operation, in an easy way.

In one particular example embodiment, the first electric machine can be switched from the operation as a motor to the operation as a generator without an interruption of tractive force. In addition, the second electric machine can be switched from the operation as a generator to the operation as a motor without an interruption of tractive force. This type of change-over operation is suitable for comfort-related reasons. In particular, the change-over can take place without the vehicle occupants noticing this.

The motor vehicle can include an electric accumulator, such as an electric battery. The electric accumulator can be charged by the first electric machine operating as a generator or by the second electric machine operating as a generator. As a result, a charging of the electric accumulator during the serial operation can take place in an easy way. As a result, the electric accumulator can be dimensioned smaller than electric accumulators that are not charged with the aid of an electric machine operating as a generator.

During the serial operation, the first electric machine can be operated as a motor and the second electric machine can be operated as a generator or, alternatively, the first electric machine can be operated as a generator and the second electric machine can be operated as a motor. Therefore, it is ensured at any time that one electric machine is utilized for driving the motor vehicle and the other electric machine is utilized for charging the electric accumulator.

In one particular example embodiment, in order to switch the second electric machine from the operation as a generator to the operation as a motor, the following can be carried out in the sequence indicated in the following.
  a. carrying out a load reduction at an internal combustion engine and the second electric machine, so that a clutch of the transmission becomes free of load,
  b. disengaging the clutch,
  c. synchronizing a first shift element of the transmission,
  d. engaging the first shift element, so that there is a driving connection between the second electric machine and an axle differential,
  e. carrying out a load reduction at the first electric machine and a load build-up at the second electric machine, so that a second shift element of the transmission becomes free of load,
  f. disengaging the second shift element,
  g. synchronizing another clutch,
  h. engaging the other clutch, so that there is a driving connection between the internal combustion engine and the first electric machine,
  i. carrying out a load build-up at the internal combustion engine and the first electric machine, wherein the first electric machine is operated as a generator.

The load reduction at the internal combustion engine and the second electric machine can take place simultaneously. After the load reduction has taken place, the electric accumulator must take over the supply of the first electric machine, which is operated as a motor, with electrical energy. Due to the load reduction at the second electric machine, the internal combustion engine is prevented from stalling due to the second electric machine, in an easy way.

The first shift element is synchronized in such a way that a rotational speed of a shift element component matches a rotational speed of another shift element component, so that, next, the first shift element can be engaged and, therefore, the two shift element components are connected to each other in a rotationally fixed manner. In particular, the rotational speed of a gearwheel drivingly connected to the second electric machine can be adapted to the rotational speed of a countershaft including an output gearwheel.

The load reduction at the first electric machine and the load build-up at the second electric machine can be carried out simultaneously. As a result, it can be ensured in an easy way that the drive torque remains constant and/or that the change-over takes place without an interruption of tractive force. In particular, the second electric machine, which is operated as a motor, can be utilized exclusively for driving the motor vehicle.

The load build-up at the internal combustion engine and the first electric machine can be carried out simultaneously. After the load reduction has taken place, the electric accumulator is unloaded. In particular, starting at this point, the electric accumulator is charged by the first electric machine, which is operated as a generator.

In one particular example embodiment, after the generation of a further change-over signal, the first electric machine can be operated as a motor and the second electric machine can be operated as a generator. In the end, the first electric machine or the second electric machine can be operated, in alternation, as a motor. As a result, a serial operation in the presence of high driving resistance is possible over a longer time period without the risk of the first electric machine or the second electric machine overheating.

The further change-over signal can be generated when the temperature of the second electric machine exceeds a threshold value or when the temperature of the second electric machine exceeds a threshold value and, in particular simultaneously, a temperature of the first electric machine falls below another threshold value. The threshold value has a greater value than the other threshold value. Alternatively or additionally, the change-over signal can be generated when a difference between the temperature of the second electric machine and the temperature of the first electric machine exceeds a further threshold value.

In addition, the change-over signal can be generated only for the case in which it is detected that the electric accumulator is charged in such a way that a sufficient amount of electrical energy is available for the change-over. In particular, a check can be carried out to determine whether there is sufficient capacity available for the change-over. The serial operation can be utilized for charging the electric accumulator to such an extent that a sufficient amount of electrical energy is available for the change-over operation. The amount of energy needed for the change-over operation is not high, because the change-over operation is short and lasts, for example, for two seconds.

In order to switch the first electric machine from the operation as a generator to the operation as a motor, the following can be carried out in the sequence indicated in the following:
  a. carrying out a load reduction at an internal combustion engine and the first electric machine, so that another clutch of the transmission becomes free of load,
  b. disengaging the other clutch,
  c. synchronizing a second shift element of the transmission,
  d. engaging the second shift element, so that there is a driving connection between the first electric machine and an axle differential,
  e. carrying out a load reduction at the second electric machine and a load build-up at the first electric machine, so that a first shift element of the transmission becomes free of load,
  f. disengaging the first shift element,
  g. synchronizing a clutch,
  h. engaging the clutch, so that there is a driving connection between the internal combustion engine and the second electric machine,
  i. carrying out a load build-up at the internal combustion engine and the second electric machine, wherein the second electric machine is operated as a generator.

The load reduction at the internal combustion engine and the first electric machine can take place simultaneously. After the load reduction has taken place, the electric accumulator must take over the supply of the second electric machine with electrical energy. Due to the load reduction that has taken place at the first electric machine, the internal combustion engine is prevented from stalling due to the first electric machine, in an easy way.

The second shift element is synchronized in such a way that a rotational speed of a shift element component matches a rotational speed of another shift element component, so that, next, the second shift element can be engaged and, therefore, the two shift element components are connected to each other in a rotationally fixed manner. In particular, the rotational speed of a gearwheel drivingly connected to the first electric machine can be adapted to the rotational speed of the countershaft.

The load reduction at the second electric machine and the load build-up at the first electric machine can be carried out simultaneously. As a result, it can be ensured in an easy way that the drive torque remains constant and/or that the change-over takes place without an interruption of tractive force. In particular, the first electric machine, which is operated as a motor, can be utilized exclusively for driving the motor vehicle.

The load build-up at the internal combustion engine and the second electric machine can be carried out simultaneously. After the load reduction has taken place, the electric accumulator is unloaded. In particular, starting at this step, the electric accumulator is charged by the second electric machine, which is operated as a generator.

The clutch and the other clutch are each utilized for drivingly connecting the transmission to the motor vehicle drive unit, such as the internal combustion engine. In particular, the internal combustion engine is idling during the above-described c through h. A shutoff of the internal combustion engine is not worthwhile, because the change-over can be carried out in a short time period.

The first electric machine can be drivingly connectable to the internal combustion engine with the aid of the other clutch. In addition, the second electric machine can be drivingly connectable to the internal combustion engine with the aid of the clutch.

The second shift element can be synchronized with the aid of a closed-loop control of the rotational speed of the first electric machine. For this purpose, a shift element component of the second shift element is brought to the desired rotational speed with the aid of the first electric machine. The first shift element can be synchronized with the aid of a closed-loop control of the rotational speed of the second electric machine. For this purpose, a shift element component of the first shift element is brought to the desired rotational speed with the aid of the second electric machine.

In the above-described b through h, the first electric machine, which is operated as a motor, or the second electric machine, which is operated as a motor, is supplied with electrical energy from the electric accumulator. With the aid of an operating strategy, it is ensured that the electric accumulator, before a change-over, has a sufficient amount of electrical energy in order to supply the particular electric machine, which is operated as a motor, with electrical energy during the change-over operation.

Of particular advantage is a transmission, in the case of which a method according to example aspects of the invention is carried out. The transmission can be an automatic transmission that has multiple gears. The transmission can have at least four, in particular precisely four, gears for a serial operation. A first gear can be implemented by engaging the second shift element, wherein the remaining shift elements are disengaged. In order to implement the first gear, additionally, the other clutch is engaged and the clutch is disengaged. In addition, a second gear can be implemented by engaging the first shift element, wherein the remaining shift elements are disengaged. In order to implement the second gear, additionally, the clutch is engaged and the other clutch is disengaged. The individual gears differ from one another with respect to their ratio between a first transmission input shaft or a second transmission input shaft and a transmission output component, such as the aforementioned output gearwheel. In the method according to example aspects of the invention, a switch can be carried out between the first gear and the second gear, in alternation, during the change-over operation.

A shaft is not to be understood exclusively as a, for example, cylindrical, rotatably mounted machine element for transmitting torques, but rather is to be understood to also be general connecting elements which connect individual components or elements to one another, in particular, connecting elements which connect multiple elements to one another in a rotationally fixed manner.

The transmission can also be designed in such a way that a purely electric mode is possible. In order to implement the purely electric mode, the clutch and/or the other clutch are/is not engaged, while, however, at least one shift element, in particular precisely one, shift element is engaged. The drive of the motor vehicle takes place with the aid of the first electric machine and/or the second electric machine.

The transmission can be designed as a dual clutch transmission. In this case, the clutch and the other clutch form a dual clutch. The dual clutch can be a form-locking dual clutch or a friction-locking dual clutch. The transmission can also be designed in such a way that it is suitable for a front transverse installation.

In addition, the transmission can include at least two, in particular precisely two, sub-transmissions A first sub-transmission is always drivingly connected to the first electric machine. A second sub-transmission is always drivingly connected to the second electric machine. Each of the sub-transmissions can have one or multiple gear plane(s). The connection of the electric machine to the particular sub-transmission can take place in one stage or in multiple stages. The connection can be designed as a spur gear connection. The connection can take place in such a way that the pre-ratios of the first electric machine and the second electric machine are different.

The motor vehicle drive unit is drivingly connectable to the first sub-transmission with the aid of the other clutch and is drivingly connectable to the second sub-transmission with the aid of the clutch. In order to implement a gear, one of the sub-transmissions, in each case, is drivingly connected to the transmission output component. Adjacent gears are implemented, in this case, by alternately drivingly connecting the first sub-transmission and the second sub-transmission to the transmission output component. The first gear and a third gear can be associated with the first sub-transmission. A second gear and a fourth gear can be associated with the second sub-transmission. Of particular advantage is the utilization of the transmission according to example aspects of the invention in a motor vehicle.

BRIEF DESCRIPTION OF THE DRAWINGS

The subject of example aspects of the invention is schematically represented in the FIGURE and is described in the following. Wherein:

FIG. 1 shows a representation of a transmission, in the case of which the method according to example aspects of the invention can be carried out.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

The transmission 2 shown in FIG. 1 is installed in a motor vehicle 1 (not shown in greater detail in FIG. 1). The transmission 2 includes a motor vehicle drive unit, such as an internal combustion engine VM, a first electric machine 3, and a second electric machine 4. In addition, the transmission 2 includes a first sub-transmission TG1 and a second sub-transmission TG2. Each of the two sub-transmissions has two gear planes. The first sub-transmission TG1 is always drivingly connected to the first electric machine 3 and the second sub-transmission TG2 is always drivingly connected to the second electric machine 4.

The transmission 2 includes a clutch K2 and another clutch K1. In addition, the transmission 2 includes a first shift element B, a second shift element A, a third shift element D, and a fourth shift element C. The first shift element B and the third shift element D are designed as a double shift element. The second shift element A and the fourth shift element C are also designed as a double shift element. The other clutch K1 and the clutch K2 are designed as a dual clutch.

An output shaft 19 of the internal combustion engine VM is rotationally fixable to a first transmission input shaft 6 with the aid of the other clutch K1. In addition, the output shaft 19 is rotationally fixable to a second transmission input shaft 5 with the aid of the clutch K2. The second transmission input shaft 5 is arranged coaxially to the first transmission input shaft 6 and partially surrounds the first transmission input shaft 6.

The first sub-transmission TG1 has two gear planes, in each of which a gear pair is arranged. A gear pair arranged in a first gear plane includes a first gearwheel 7 and a second gearwheel 8, which are in engagement with one each other. A second gear pair arranged in a second gear plane includes a third gearwheel 9 and a fourth gearwheel 10, which are in engagement with each other. The second gearwheel 8 and the fourth gearwheel 10 are each rotationally fixed to the first transmission input shaft 6. The first electric machine 3 is always drivingly connected to the first gearwheel 7 with the aid of a traction mechanism in the form, for example, of a chain.

The second sub-transmission TG2 has two other gear planes, in each of which another gear pair is arranged. A first other gear pair arranged in a first gear plane includes a first other gearwheel 11 and a second other gearwheel 12, which are in engagement with each other. A second other gear pair arranged in a second other gear plane includes a third other gearwheel 13 and a fourth other gearwheel 14, which are in engagement with each other. The second other gearwheel 12 and the fourth other gearwheel 14 are each rotationally fixed to the second transmission input shaft 5.

The second electric machine 4 is always drivingly connected to the fourth other gearwheel 14 with the aid of a traction mechanism in the form, for example, of a chain. The first electric machine 3 and the second electric machine 4 are arranged axially offset and/or axially parallel with respect to the first transmission input shaft 6 and/or the second transmission input shaft 5.

The transmission 2 includes a countershaft 15. The countershaft 15 includes, as a transmission output component, an output gearwheel 16, which is engaged with a gearwheel 17 of an axle differential 18. The axle differential 18 is drivingly connected to vehicle wheels (not represented in FIG. 1). Gear shafts of the axle differential 18 extend in parallel to the first transmission input shaft 6 and the second transmission input shaft 5.

The first gearwheel 7 is rotationally fixable to the countershaft 15 with the aid of the fourth shift element C. The third gearwheel 9 is rotationally fixable to the countershaft 15 with the aid of the second shift element A. The first other gearwheel 11 is rotationally fixable to the countershaft 15 with the aid of the first shift element B. The third other gearwheel 13 is rotationally fixable to the countershaft 15 with the aid of the third shift element D.

With the aid of the transmission 2, a purely electric mode is possible with the aid, for example, of the first electric machine 3. In the purely electric mode, the second shift element A or the fourth shift element C is engaged and the two clutches K1, K2 are disengaged. A first gear is implemented when the second shift element A is engaged and a third gear is implemented when the fourth shift element C is engaged. In addition, with the aid of the transmission 2, a purely electric mode is possible with the aid of the second electric machine 4. In the purely electric mode with the aid of the second electric machine 4, the first shift element B or the third shift element D is engaged and the two clutches K1, K2 are disengaged. A second gear is implemented when the first shift element B is engaged and a fourth gear is implemented when the third shift element D is engaged.

During the serial operation, the second shift element A and the clutch K2 are engaged and the remaining shift elements and the other clutch K1 are disengaged. In this engagement condition, the first electric machine 3 is utilized for driving the motor vehicle 1 and the second electric machine 4 is operated as a generator. The second shift element A is engaged, because there is a low ground speed during the serial operation and, therefore, the first gear is more suitable than the third gear resulting when a fourth shift element C is engaged.

As soon as it is determined, for example, that the temperature of the first electric machine 3 exceeds a threshold value, the above-described change-over operation takes place. After the change-over operation, the first shift element B and the other clutch K1 are engaged and the remaining shift elements and the clutch K2 are disengaged. A serial operation is also possible in this engagement condition, wherein the first electric machine 3 is utilized as a generator and the second electric machine 4 is utilized for driving the motor vehicle 1. The first shift element B is engaged, because the second gear is more suitable at a low ground speed than the fourth gear resulting when a third shift element D is engaged.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

1 motor vehicle
2 transmission 3 first electric machine
4 second electric machine
5 second transmission input shaft
6 first transmission input shaft
7 first gearwheel
8 second gearwheel
9 third gearwheel
10 fourth gearwheel
11 first other gearwheel
12 second other gearwheel
13 third other gearwheel
14 fourth other gearwheel
15 countershaft
16 output gearwheel
17 gearwheel
18 axle differential
19 output shaft
A second shift element
B first shift element
C fourth shift element
D third shift element
K1 other clutch
K2 clutch
VM internal combustion engine
TG1 first sub-transmission
TG2 second sub-transmission

The invention claimed is:

1. A method for serial operation of a motor vehicle (1) that includes a transmission (2), comprising:
   operating a first electric machine (3) of the transmission (2) as a motor for driving the motor vehicle (1);
   operating a second electric machine (4) of the transmission (2) as a generator;
   generating a change-over signal
      when a temperature of the first electric machine (3) exceeds a threshold value or
      when the temperature of the first electric machine (3) exceeds the threshold value and a temperature of the second electric machine (4) falls below another threshold value; and
   after generation of the change-over signal, switching the first electric machine (3) from the operation as the motor to the operation as the generator, and switching the second electric machine (4) from the operation as the generator to the operation as the motor in order to drive the motor vehicle (1).

2. The method of claim 1, wherein:
   the first electric machine (3) is switched from the operation as the motor to the operation as the generator without an interruption of tractive force; and/or
   the second electric machine (4) is switched from the operation as the generator to the operation as the motor without the interruption of tractive force.

3. The method of claim 1, further comprising charging an electric accumulator with the first electric machine (3) operating as the generator or with the second electric machine (4) operating as the generator,
   wherein either the first electric machine (3) is operated as the motor and the second electric machine (4) is operated as the generator or the first electric machine (3) is operated as the generator and the second electric machine (4) is operated as the motor.

4. A transmission, configured to implement the method of claim 1.

5. A method for serial operation of a motor vehicle (1) that includes a transmission (2), comprising:
   operating a first electric machine (3) of the transmission (2) as a motor for driving the motor vehicle (1);
   operating a second electric machine (4) of the transmission (2) as a generator;
   generating a change-over signal when a difference between a temperature of the first electric machine (3) and a temperature of the second electric machine (4) exceeds a threshold value; and
   after generation of the change-over signal, switching the first electric machine (3) from the operation as the motor to the operation as the generator, and switching the second electric machine (4) from the operation as the generator to the operation as the motor in order to drive the motor vehicle (1).

6. A transmission, configured to implement the method of claim 5.

7. A method for serial operation of a motor vehicle (1) that includes a transmission (2), comprising:
   operating a first electric machine (3) of the transmission (2) as a motor for driving the motor vehicle (1);
   operating a second electric machine (4) of the transmission (2) as a generator; and
   after generation of a change-over signal, switching the first electric machine (3) from the operation as the motor to the operation as the generator, and switching the second electric machine (4) from the operation as the generator to the operation as the motor in order to drive the motor vehicle (1), the switching of the second electric machine (4) from the operation as the generator to the operation as the motor comprises in the following sequence
      carrying out a load reduction at an internal combustion engine (VM) and the second electric machine (4) in order to unload a first clutch (K2) of the transmission (2),
      disengaging the first clutch (K2),
      synchronizing a first shift element (B) of the transmission (2),
      engaging the first shift element (B) to form a driving connection between the second electric machine (4) and an axle differential (18),
      carrying out a load reduction at the first electric machine (3) and a load build-up at the second electric machine (4) in order to unload a second shift element (A) of the transmission (2),
      disengaging the second shift element (A),
      synchronizing a second clutch (K1),
      engaging the second clutch (K1) to form a driving connection between the internal combustion engine (VM) and the first electric machine (3), and
      carrying out a load build-up at the internal combustion engine (VM) and the first electric machine (3) such that the first electric machine (3) is operated as the generator.

8. The method of claim 7, wherein:
   the first electric machine (3) is drivingly connectable to the internal combustion engine (VM) with the second clutch (K1); and/or
   the second electric machine (4) is drivingly connectable to the internal combustion engine (VM) with the first clutch (K2).

9. The method of claim 7, wherein:
   a second gear is implemented by engaging the first shift element (B); and/or
   a first gear is implemented by engaging the second shift element (A).

10. The method of claim 7, wherein:
the synchronization of the second shift element (A) is carried out with a closed-loop control of a rotational speed of the first electric machine (3); and/or
the synchronization of the first shift element (B) is carried out with a closed-loop control of a rotational speed of the second electric machine (4).

11. A transmission, configured to implement the method of claim 7.

12. A method for serial operation of a motor vehicle (1) that includes a transmission (2), comprising:
operating a first electric machine (3) of the transmission (2) as a motor for driving the motor vehicle (1);
operating a second electric machine (4) of the transmission (2) as a generator;
after generation of a change-over signal, switching the first electric machine (3) from the operation as the motor to the operation as the generator, and switching the second electric machine (4) from the operation as the generator to the operation as the motor in order to drive the motor vehicle (1);
generating a further change-over signal
when a temperature of the second electric machine (4) exceeds a threshold value or
when the temperature of the second electric machine (4) exceeds the threshold value, and a temperature of the first electric machine (3) falls below another threshold value;
after generation of the further change-over signal, operating the first electric machine (3) as the motor, and operating the second electric machine (4) as the generator.

13. A method for serial operation of a motor vehicle (1) that includes a transmission (2), comprising:
operating a first electric machine (3) of the transmission (2) as a motor for driving the motor vehicle (1);
operating a second electric machine (4) of the transmission (2) as a generator;
after generation of a change-over signal, switching the first electric machine (3) from the operation as the motor to the operation as the generator, and switching the second electric machine (4) from the operation as the generator to the operation as the motor in order to drive the motor vehicle (1);
generating a further change-over signal when a difference between a temperature of the second electric machine (4) and a temperature of the first electric machine (3) exceeds a further threshold value; and
after generation of the further change-over signal, operating the first electric machine (3) as the motor, and operating the second electric machine (4) as the generator.

14. A method for serial operation of a motor vehicle (1) that includes a transmission (2), comprising:
operating a first electric machine (3) of the transmission (2) as a motor for driving the motor vehicle (1);
operating a second electric machine (4) of the transmission (2) as a generator; and
after generation of a change-over signal, switching the first electric machine (3) from the operation as the motor to the operation as the generator, and switching the second electric machine (4) from the operation as the generator to the operation as the motor in order to drive the motor vehicle (1); and
after generation of a further change-over signal, operating the first electric machine (3) as the motor, and operating the second electric machine (4) as the generator, switching the first electric machine (3) from the operation as the generator to the operation as the motor comprises in the following sequence:
carrying out a load reduction at an internal combustion engine (VM) and the first electric machine (3) in order to unload a second clutch (K1) of the transmission (2),
disengaging the second clutch (K1),
synchronizing a second shift element (A) of the transmission (2),
engaging the second shift element (A) to form a driving connection between the first electric machine (3) and an axle differential (18),
carrying out a load reduction at the second electric machine (4) and a load build-up at the first electric machine (3) in order to unload a first shift element (B) of the transmission (2),
disengaging the first shift element (B),
synchronizing a first clutch (K2),
engaging the first clutch (K2) to form a driving connection between the internal combustion engine (VM) and the second electric machine (4), and
carrying out a load build-up at the internal combustion engine (VM) and the second electric machine (4) such that the second electric machine (4) is operated as the generator.

15. The method of claim 14, wherein:
the internal combustion engine (VM) idles between synchronizing the second shift element (A) and engaging the first clutch (K2); and/or
the first electric machine (3) is supplied with electrical energy from an electric accumulator when the first electric machine (3) is operated as the motor, and the second electric machine (4) is supplied with electrical energy from the electric accumulator when the second electric machine (4) is operated as the motor.

16. The method of claim 14, wherein:
the first electric machine (3) is drivingly connectable to the internal combustion engine (VM) with the second clutch (K1); and/or
the second electric machine (4) is drivingly connectable to the internal combustion engine (VM) with the first clutch (K2).

17. The method of claim 14, wherein:
a second gear is implemented by engaging the first shift element (B); and/or
a first gear is implemented by engaging the second shift element (A).

18. The method of claim 14, wherein:
the synchronization of the second shift element (A) is carried out with a closed-loop control of a rotational speed of the first electric machine (3); and/or
the synchronization of the first shift element (B) is carried out with a closed-loop control of a rotational speed of the second electric machine (4).

* * * * *